United States Patent [19]

Kathmann

[11] Patent Number: 5,031,079
[45] Date of Patent: Jul. 9, 1991

[54] VEHICLE HEADLIGHT

[75] Inventor: Franz Kathmann, Lippstadt, Fed. Rep. of Germany

[73] Assignee: Hella KG Hueck & Co., Fed. Rep. of Germany

[21] Appl. No.: 511,349

[22] Filed: Apr. 19, 1990

[30] Foreign Application Priority Data

Apr. 21, 1989 [DE] Fed. Rep. of Germany ....... 3913151

[51] Int. Cl.$^5$ .................................................. B60Q 1/00
[52] U.S. Cl. ....................................... 362/61; 362/66; 362/282; 362/322
[58] Field of Search ................... 362/61, 66, 282, 284, 362/289, 322, 324

[56] References Cited

U.S. PATENT DOCUMENTS

| 4,621,307 | 11/1986 | Weber ..................... 362/66 |
| 4,722,029 | 1/1988 | Ahle et al. ............... 362/66 |
| 4,849,860 | 7/1989 | Schauwecker ............. 362/284 X |

FOREIGN PATENT DOCUMENTS

| 0298551 | 1/1989 | European Pat. Off. .............. 362/66 |
| 3425646C1 | 10/1985 | Fed. Rep. of Germany . |
| 3509831A1 | 3/1986 | Fed. Rep. of Germany . |
| 3543563C1 | 5/1987 | Fed. Rep. of Germany . |

Primary Examiner—Carl D. Price
Assistant Examiner—Sue Hagarman
Attorney, Agent, or Firm—Griffin Branigan & Butler

[57] ABSTRACT

A resinous plastic reflector unit (1) is mounted on a receiving member (8) by at least a first and a second joining member (9, 10) to be adjustable at least about one axis. The second joining member is clamp-like and is self guidingly shoved onto a wall member (16) on a rear side of a reflector bowl (2, 3). Wall strength of the wall member is not substantially greater than wall strength of a thin wall forming the reflection bowl. The wide side surfaces of first and second such wall members run perpendicular to one another. A joint between the first and second joining members lies, when viewed in an installation direction of the reflector bowl, aligned behind a thin wall portion of the reflector unit.

22 Claims, 3 Drawing Sheets

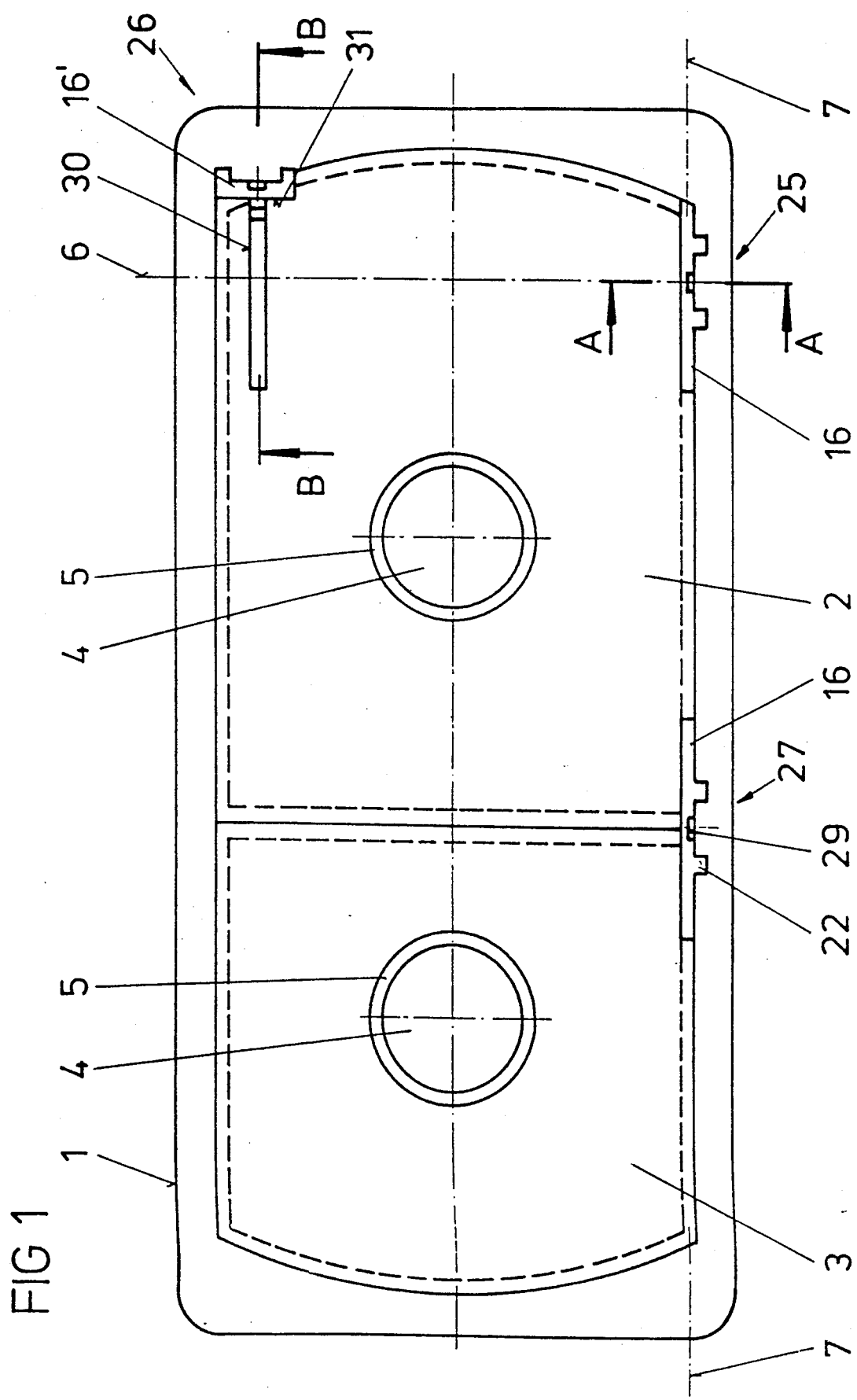

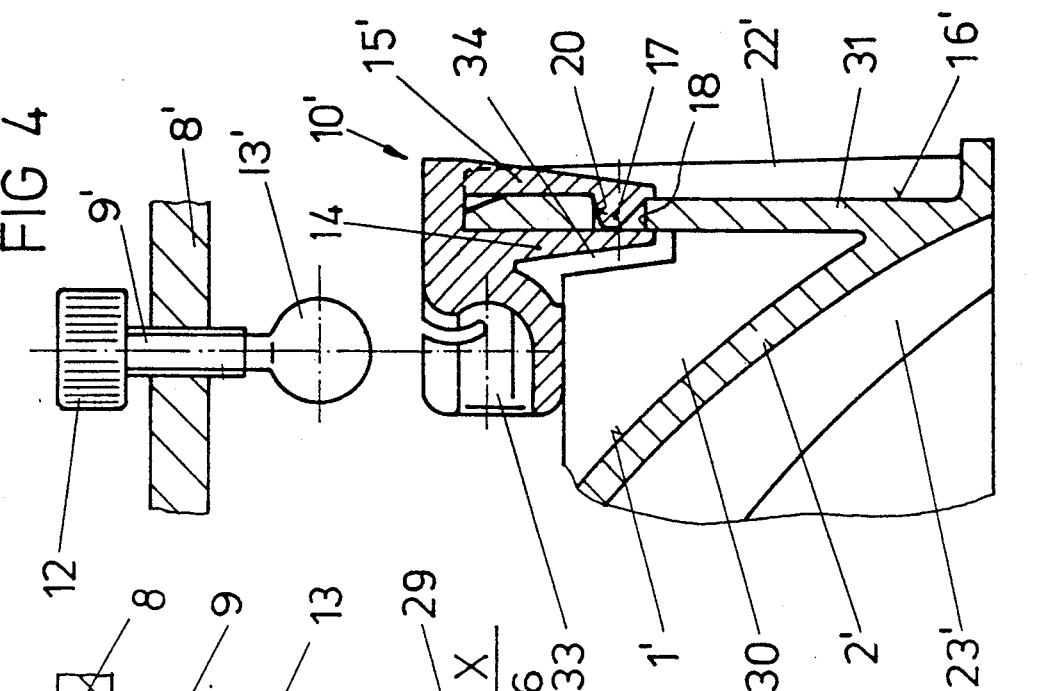

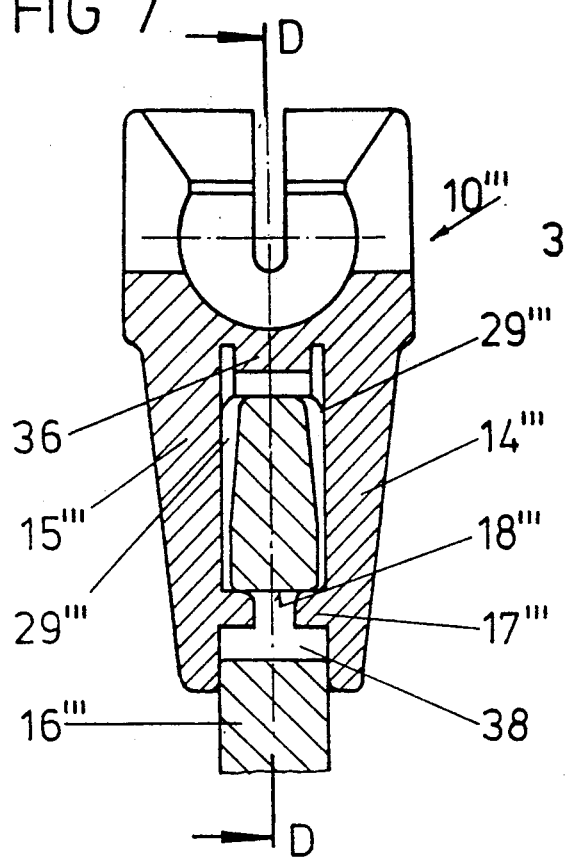
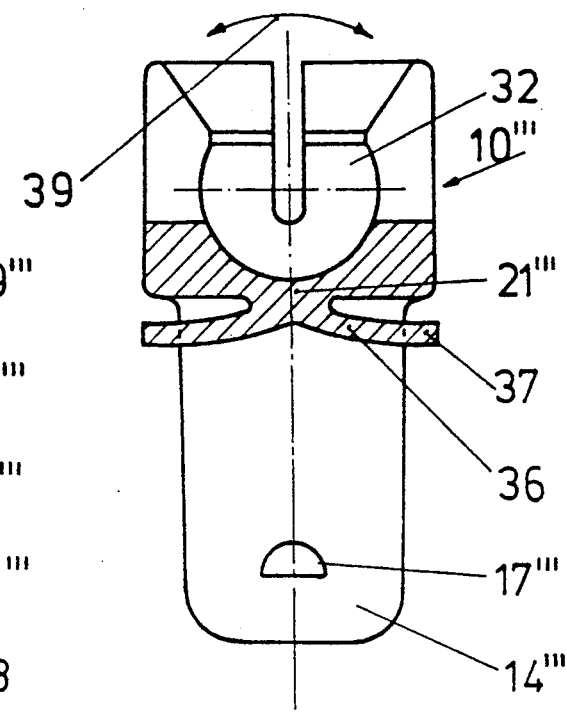
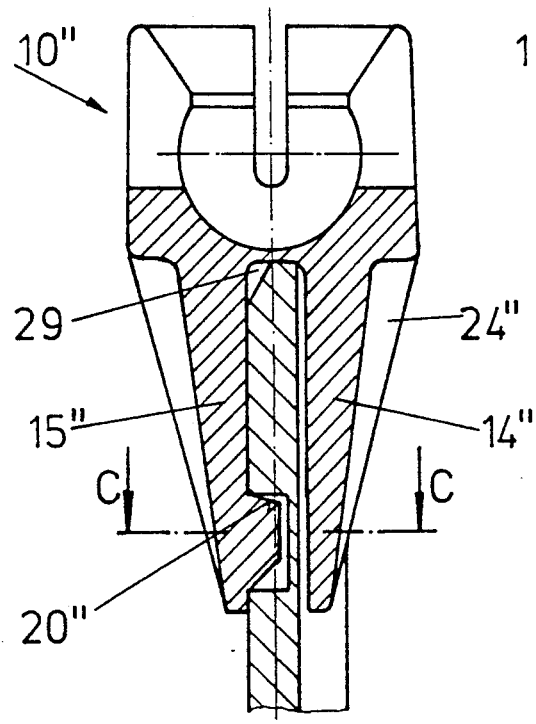
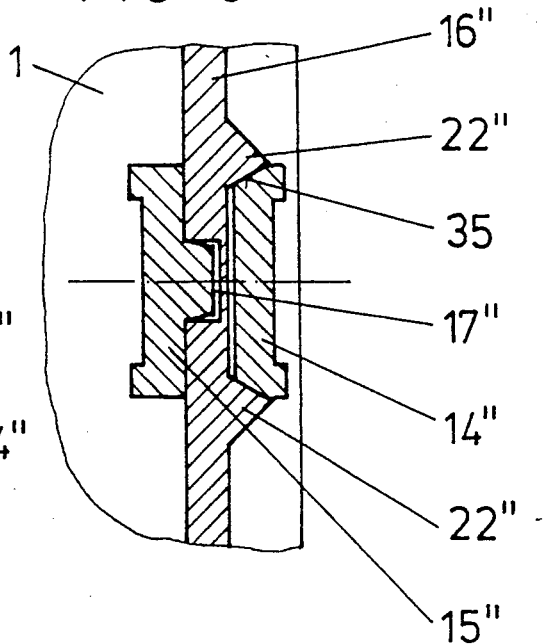

VEHICLE HEADLIGHT

This invention relates generally to headlights, and more particularly to mountings for headlights which allow adjustment thereof.

This invention relates even more particularly to a headlight having a resinous plastic reflector unit mounted on a receiving member to be adjustable about two axes which are perpendicular to one another, with a joint coupling the reflector to the receiving member being formed by a first joining member attached to the receiving member and a second joining member of resinous plastic being attached to a wall member having relatively flat side surfaces which is on a rear surface, relative to a light exit direction, of a reflector bowl, there being a self guiding and locking joint between the first and second joining members, with an engagement direction thereof corresponding to an installation direction of the reflector unit.

A headlight having a mount of the type with which this invention is concerned is disclosed in German Offenlegungsschrift 3,509,831. The mount comprises a threaded bolt which serves as a first joining member with its length axis running in an installation direction of a headlight reflector. The threaded bolt has a ball on a free end thereof which extends into a headlight cavity which, when mounting the reflector in or on a receiving member, self-guiding snaps into a resinous plastic socket of a second joining member. Because the length axis of the threaded bolt runs in a line laterally spaced from a wide side surface of a wall member on which the second joining member is mounted, the wall member is caused to bend a great deal when accomplishing this self guiding connection. Because of this, the wall member is made to be considerably thicker than a reflection bowl of the reflector. In order to maintain a firm seating of the second joining member on the wall member it is made to be shell-like and is shoved onto the wall member, which is oonically tapered toward its free end, until interior surfaces of the shell lie on side surfaces of the wall member and a locking nose on the interior surfaces of the shell snaps self guidingly into an opening of the wall member. In this manner, the wall member directs its greatest wall strength of a joint toward the reflection bowl. In any event, the wall member must be made to be very thick so that the reflector is securely held on the receiving member to be motionless, square to wide side surfaces of the wall member. Because the wall member is relatively thick, disturbances or indentations can be created on the surface of the reflector and thereby cause objectionable scattered light beams for opposite traffic.

German patent 3,543,563 describes a headlight for a vehicle in which a wall member on a rear side of a reflection bowl is in the form of a hollow cylinder, whose wall tapers to a cone towards its free end. With this arrangement the wall strength of the cylinder at the end portion of the hollow cylinder which is formed on the reflection bowl, is considerably thicker than that of the reflection bowl. This is necessary so that the cylinder can withstand a high clamping pressure created when the cylinder is shoved into a socket. So that the socket is not loosened from its connection with the hollow cylinder shaped wall member a spring arm is formed on the socket oriented in an installation direction of the socket having a locking nose thereon which grips into an opening of an outer surface of the cylinder.

In a headlight of German patent 3,425,646 a wall member is not directly attached to a reflection bowl of a reflector so that in this case no problems are created in regard to wall strength of the wall member. However, also in this headlight when connecting joining parts in a self guiding snapping manner a wall member is caused to bend considerably and it cannot be determined with certainty that a reflector will be held motionlessly and secure on a receiving member.

A purpose of this invention is to improve prior art headlights of the type generally described herein so that a wall member on a rear side of a reflection bowl of a reflector can have such a thin wall that no substantial bothersome distortions or indentations are created on a reflection surface of a reflector of the reflection bowl. Also, it is a purpose of this invention to provide such a thin wall member which can withstand great pressures arising when first and second joining members are self guidingly joined together, that is, the wall member is not strained by bending.

SUMMARY OF THE INVENTION

According to principles of this invention, wall strength of a wall member attached to a rear side of a reflector bowl of a reflector is not substantially greater than wall strength of a thin wall of the reflection bowl. A clamp-like second joining member is mounted on the wall member. A second wall member has wide flat side surfaces arranged perpendicular to wide flat side surfaces of a first wall member. As seen in an installation direction of the reflector, a joining position, or joint, of first and second joining members is aligned behind a thin wall portion of the reflector.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a rear view of a reflector assembly according to principles of this invention with two reflection bowls as individual parts of a reflector unit;

FIG. 2 is a segmented, exploded, cross sectional view taken on line A—A of FIG. 1 at a fixed adjustment point of the reflector unit with the reflector unit being attached to a receiving part by a joining mechanism;

FIG. 3 is a segmented cross-sectional view taken from a direction X in FIG. 2 of a wall member of a first reflector bowl with a clamp-like second joining member which is shoved onto the wall member;

FIG. 4 is a segmented, exploded, cross sectional view taken along a line B—B in FIG. 1 at a movable adjustment point of the reflector unit at which a clamplike second joining member and a wall member are formed differently than at the fixed adjustment point of FIG. 2;

FIG. 5 is a cross section taken in length along an axis of a second embodiment clamp-like second joining member of FIG. 2 engaging a recess of a wall member positioned between its two legs;

FIG. 6 is a section taken along line C—C in FIG. 5;

FIG. 7 is a cross section taken along the length axis of a third embodiment of the second joining member of FIG. 2 with a wall member between its legs; and FIG. 8 is a cross section taken along line D—D in FIG. 7.

DETAILED DESCRIPTION OF PREFERRED EMBODIMENTS

A resinous plastic reflector unit 1 (see FIG. 1) is rectangularly shaped and comprises two reflector bowls 2 and 3 immediately adjacent one another. At an apex of each of the reflector bowls 2 and 3 are openings 4 for receiving light bulbs (not shown) which are surrounded by collars 5 on back sides of the reflector bowls. The reflector unit 1 is adjustable about two orthogonal axes 6 and 7. The reflector unit 1 is mountable or mounted, on a receiving part 8 (FIG. 2) by means of a joining mechanism comprising a first joining member 9 attached to the receiving member 8 and a resinous plastic second joining member 10 which is secured to the reflector 1. A threaded bolt which is screwed into the receiving member 8 serves as the first joining member 9, with its long axis being parallel to an installation direction 11 of the reflector unit 1. The first joining bolt includes a gripping knob 12 (not shown in FIG. 1) attached to a free end of the threaded bolt which is outside of the receiving member 8 while a ball 13 is at the other end of the threaded bolt extending into the interior of a headlight cavity of the receiving member 8.

It should be understood that the same reference numbers are used to identify similar elements of different embodiments shown in the drawings, but where the elements are not identical an additional suffix character, such as a prim symbol, has been added to some of them to differentiate between elements. Similarly, although the singular is often used to describe these elements, it should be understood that there can be a plurality of similar such elements in different embodiments with the same number. Usually, the joining members of FIGS. 2 and 3 are specifically referred to unless otherwise designated.

The second joining member 10, which is constructed of resinous plastic, is clamp-like, with legs 14 and 15 extending approximately parallel to the installation direction 11 which are shoved onto a wall member 16 formed on a rear side of one of the reflection bowls 2 or 3. The legs 14 and 15 of the clamp-like second joining member 10 are prestressed to be urged toward broad side surfaces of the wall member 16 and a locking nose 17 at a free end of the leg 15 grips in a recess 18 of the wall member. The locking nose 17 has a tapered ramp 20 with which, due to prestressing, engages an edge defining the recess 18, and a cross piece 21 coupling the legs 14 and 15 is pressed against a peripheral edge of the wall member 16. In this manner, an entire length of the cross piece 21 lies tightly on the outer peripheral edge of the wall member 16. The legs 14 and 15 which are rectangularly shaped in cross sections, are tapered inwardly along their narrow length edges, or sides, toward their free ends, with these narrow length sides lying on inner sides of ribs 22. Ribs 22 can be somewhat thicker than a main portion of the wall member 16 when they are not formed on portions of the reflector bowls 2 and 3 forming reflection surfaces 23. Stiffening ribs 24 are formed on exterior wide sides of the legs 14 and 15 15 extending along the lengths thereof.

A fixed adjustment point 25 of the reflector assembly 1 lies at an intersection of axes 6 and 7 while movable adjustment points 26 and 27 are movable toward and away from the receiving part 8. The wall members 16 at the fixed adjustment point 25 and the movable adjustment point 27 are at flattened portions of reflector bowls as can be seen in FIG. 2. The wall member 16 defines a tapered ramp 29 between the ribs 22 at its free outer end, or peripheral edge, which, when the clamp like second joining member 10 is installed thereon serves as a glide, and guide, surface for the locking nose 17. The wall member 16 at the movable point 27 serves as a connecting cross piece between the reflector bowls 2 and 3. This increases stiffness between reflector bowls 2 and 3. The wall member 16' (FIG. 4) at the movable adjustment point 26, when viewed in the installment direction 11 of the reflector assembly, is T-shaped. A portion of the wall member forming a square beam 30 of the T-shape is lower, or shorter, than that portion forming a cross beam 31 of the T-shape.

The ball 13 of the first joining member 9 and a joining socket 32 of the second joining member 10 serve to join the first and second joining members together at a joining position, or joint. When installing the reflector assembly 1 in or on the receiving member 8 the ball 13 is pressed, self guiding and self locking into the socket 32. At each of the fixed adjustment point 25 and the movable adjustment point 27 the joining socket 32 lies directly over the legs 14 and 15 of the second joining member while at the movable adjustment point 26 a oining socket 33 lies directly over that portion of the wall member forming the square beam 30 of the T-shape. In this regard, the joining socket 33 opens laterally to the legs 14' and 15' of the second joining member 10' so that a reflector assembly can be easily dismounted by easily rotating the ball 13 out of the joining socket 33.

The clamp-like second joining member 10" and the wall member 16" of FIGS. 5 and 6 differ from those already described as follows: the ribs 22", which are formed on the wide side surface of the wall member 16", define a wedge-shaped groove on whose wedge-shaped interior side surfaces ramp-like surfaces of the second joining member, which are prestressed to be urged toward a floor surface of the groove, lie. Substantially the entire interior side surface of the leg 15", because of prestressing, lies on the adjacent wide side surface of the wall member 16".

The clamp-like second joining member 10''' of FIGS. 7 and 8 includes a spring element 36 on a cross piece 21''' of legs 14''' and 15''' for contacting a peripheral edge of the wall member 16'''. The spring element 36 has a wing-like shape. A wing 36 is attached centrally between the legs to the cross member 21''' while a free end 37 of the wing is flexed against a peripheral edge of the wall member 16''', with free ends of both legs 14''' and 15''' having locking noses 17''' which press against a rounded edge of the opening, or recess 18'''. The locking noses 17''' describe in cross section parallel to wide side surfaces of the wall member 16''' a circular arc, or sector, which contacts an edge forming the recess 18. The wall member 16''' does not have ribs on its wide side surfaces so that the clamp-like second joining member 10''', can be rotatable about an axis formed by the locking noses 17''' and the circular opening, or recess, 38 (see arrow 39). In this manner, it is useful for the outer peripheral edge of the wall member 16''' to also define a circular arc whose center is at this rotation axis. When mounting the second joining member 10''' along the wall member 16''' each locking nose 17''' slides along a tapered side 29''' of the wall member until it self locks in the circular opening 38.

Because the bending resistance of the wall members perpendicular to their wide side surfaces are relatively small, two of the wall members are positioned perpendicular to one another. In this regard, it is additionally beneficial if, as seen perpendicular to the installation direction of the joining members, the wall member is longer than the second joining member is wide. When this is the case, a bending resistance of the wall member square to its wide side surfaces is increased.

It is beneficial in execution of this invention to hold the reflection bowl square to wide side surfaces of the wall member to be secure and motionless, thereby providing increased bending resistance of the wall member square to its wide surfaces.

In addition, it is beneficial to arrange the legs of the second joining member between outwardly protruding ribs of the wall members and to have such ribs on either one or both sides of the wide side surfaces of the wall member. Such ribs can clamp the legs of the claap-like second joining member tightly between them and/or serve as guides for the legs when the clamp-like second joining member is mounted on the wall member. To make it still easier to slide the legs between the ribs, it is further beneficial if at least one of the legs of the clamp-like second joining member tapers inwardly toward its free end along its narrow long edge, or side.

Still further, it is beneficial when a groove defined by two such ribs on a wide side surface of a wall member is wedge shaped, so that wedge shaped side surfaces of a leg of the clamp-like second joining member can springingly lie approximately flush against corresponding wedge-shaped surfaces of the ribs. With such an embodiment, a fixing stability of the clamp-like second joining member on the wall member is quite good.

In this regard, it is further beneficial that a locking nose on a free end portion of a leg of the clamp-like second joining member self guides and self locks into a recess of the wall member, especially when the locking nose tapers toward its free end to form a ramp thereon which lies against an edge forming the recess. Because of this, the clamp-like second joining member can be quickly and easily mounted on the wall member and further the ramp on the locking nose balances tolerance requirements between it and a leg cross piece of the clamp-like second joining member so that the cross piece, along its entire length is tightly held on a peripheral edge of the wall member.

So that it is easier to mount the clamp-like second joining member on the wall member, it is beneficial to form a ramp at the peripheral edge on which the cross piece of the clamp-like second joining member lies. In this manner, the locking nose glides along this ramp as the clamp-like second joining member is shoved onto the wall member until it grips the recess of the wall member at an end position of the clamp-like second joining member.

To form a spring element on the cross piece of the legs of a clamp-like second joining member which is springingly urged against the peripheral edge of the wall member is also beneficial. It is particularly beneficial to form the spring element to be wing-like with wings attached to the cross member at a central position with free ends of the wings extending outwardly to contact the peripheral surface of the wall member. Such a structure allows extremely large tolerances between the wall member and the clamp-like second joining member but yet the clamp-like second member sits, play free, in its installation direction, on the wall member.

In a particularly beneficial further embodiment of the invention locking noses of legs of the clamp-like second joining member describe circular sectors, or arcs, in cross section defining circular surfaces lying against a circular edge forming a recess in the wall member, the circular surfaces and circular edge being concentric to form a center axis. With such an arrangement, it is possible for a clamp-like second joining member to be rotatable about the center axis. In this regard, it is further beneficial when wall members which are coupled to such an adjustable second joining member have wide side surfaces which run perpendicular to this center axis. In this manner, when the reflector assembly is adjusted, no stress forces are created which are otherwise created to change reflection surfaces of thin wall reflectors.

Similarly, it is beneficial for a joining position, or joint, between the first and second joining members to be located directly above the leg cross member of the clamp-like second joining member. With such an arrangement, it is not necessary that the wall member be substantially longer in a direction perpendicular to the installment direction of the reflector assembly than the breath of the legs of the clamp-like second joining member.

Moreover, it is beneficial for the wall member, as seen in the installation direction of the clamp-like second joining member, to have a T-shape with a peripheral edge in the square beam portion of the T-shape serving as a support surface for a joining position of the joining members, while the clamp-like second joining member is shoved onto that portion of the wall member forming the cross beam of the T. In this regard, it is further beneficial for a leg of the clamp-like second joining member to extend into a cutout, or slot, of the T-form wall member and for the portion of the wall member forming the square beam of the T to have a lesser height than that portion of the wall member forming the cross beam of the T. Such an embodiment is particularly beneficial when there is very little room on a back side of a reflector assembly because, in this case, a joining position is not above, or aligned with, legs of a clamp-like second joining member, but rather is arranged to the side thereof.

In a particularly beneficial embodiment of the invention a joining assembly comprises a joining socket of a second joining member and a ball, which is self guiding and locking into the joining socket, mounted on a threaded bolt fastened to the receiving member with a length axis extending in an installment direction of the reflector unit. If in such an embodiment the ball/socket joint lies directly over a leg-joining cross piece, pressure of the legs against the wall member is increased by pressure of the ball against the socket.

The embodiments of the invention in which an exclusive property or privilege are claimed or defined as follows:

1. In a headlight for a vehicle of a type in which a plastic reflector bowl having a relatively thin reflector shell wall forming said bowl is mounted on a receiving member to be selectively adjustable about one or two perpendicular axes by means of a first joining member which is attached to said receiving member and a second joining member attached to a first wall member having substantially flat wide side surfaces on a rear side, opposite to a light exit side, of the reflector bowl, said first and second joining members forming a self guiding joint whose engaging direction corresponds to an installment direction for mounting said reflector bowl on said receiving member, the improvement wherein:

the wall strength of the first wall member on the rear side of the reflector bowl is not substantially greater than the wall strength of the relatively thin reflector shell wall forming the reflector bowl; and the second joining member is clamped to the first wall member;

wherein a coupling position of the first and second joining members is aligned behind said first wall member in said installment direction.

2. In a headlight as in claim 1 wherein said second joining member has two elongated legs which are clamped on opposite sides of said first wall member in between protruding ribs of said first wall member.

3. In a headlight as in claim 2 wherein there are protruding ribs positioned on both wide side surfaces of the said first wall member.

4. In a headlight as in claim 2 wherein one of the legs of the clamping second joining member tapers inwardly toward a free end thereof along a narrow elongated side thereof.

5. In a headlight as in claim 4 wherein the narrow elongated side contacts one of the protruding ribs.

6. In a headlight as in claim 2 wherein the protruding ribs define a wedge shaped groove and narrow elongated sides of one leg are wedge shaped to correspond to the shape of said ribs and springingly rest approximately flush thereon.

7. In a headlight as in claim 2 wherein a free end of one of said legs has a locking nose thereon which self guides into a recess of said first wall member.

8. In a headlight as in claim 7 wherein the locking nose has a tapered ramp extending toward its free end to engage an edge of the wall member defining the recess.

9. In a headlight as in claim 7 wherein the first wall member defines a ramp at its outer peripheral edge to be adjacent a cross piece of the second joining member extending between the legs when the second joining member is mounted on the wall member and for contacting the locking nose and thereby separating the legs of the second joining member when it is being urged onto the first wall member.

10. In a headlight as in claim 7 wherein said locking nose has a partial circular shape in cross section and a recess edge of the wall member forming said recess is also circular so that these elements contact one another, with a center rotation axis being approximately at the center of a cirle formed by the recess edge.

11. In a headlight as in claim 2 wherein a cross piece of the second joining member connecting the two legs rests tightly against an outer peripheral edge of the first wall member when the second joining member is mounted on the first wall member.

12. In a headlight as in claim 11 wherein the cross piece rests tightly against the outer peripheral edge along its entire length.

13. In a headlight as in claim 2 wherein a cross piece of the second joining member connecting the two legs has a spring element mounted thereon which lies under tension on a peripheral edge of the first wall member.

14. In a headlight as in claim 13 wherein the spring element is wing-like with a wing mounted at a central area of the cross piece with a free end thereof lying on said peripheral edge of the first wall member.

15. In a headlight as in claim 2 wherein the joint between the first and second joining members lies directly above a cross piece extending between the legs, in approximate alignment with the legs.

16. In a headlight as in claim 1 wherein the wide side surfaces of the first wall member on which the second joining member is mounted are relatively flat and are perpendicular to an axis about which the reflector bowl is adjustable.

17. In a headlight as in claim 1 wherein the first wall member, when viewed in an installation direction of the second joining member on the wall member is T-shaped and an outer peripheral edge in an area of a square beam of the T serves as a support area for a joint between the joining members, while the second joining member is shoved onto a cross beam of the T-shape.

18. In a headlight as in claim 17 wherein a leg of the clamp-like second joining member extends into a notch of 19. In a headlight as in claim 17 wherein the T-formed wall member is lower at the square beam.

20. In a headlight as in claim 1 wherein the first wall member is an extension of a flattened portion of a wall of the reflector bowl.

21. In a headlight as in claim 1 wherein there is an additional means mounted on said shell wall for resisting bending of said wall member square to its wide side surfaces.

22. In a headlight as in claim 21 wherein said additional means is an additional wall member having wide side surfaces which are approximately perpendicular to wide side surfaces of the first wall member coupled between the shell wall and the receiving member.

* * * * *